V. R. KOONTZ.
CUTTER HEAD.
APPLICATION FILED JUNE 23, 1913.
1,098,268.
Patented May 26, 1914.
3 SHEETS—SHEET 1.
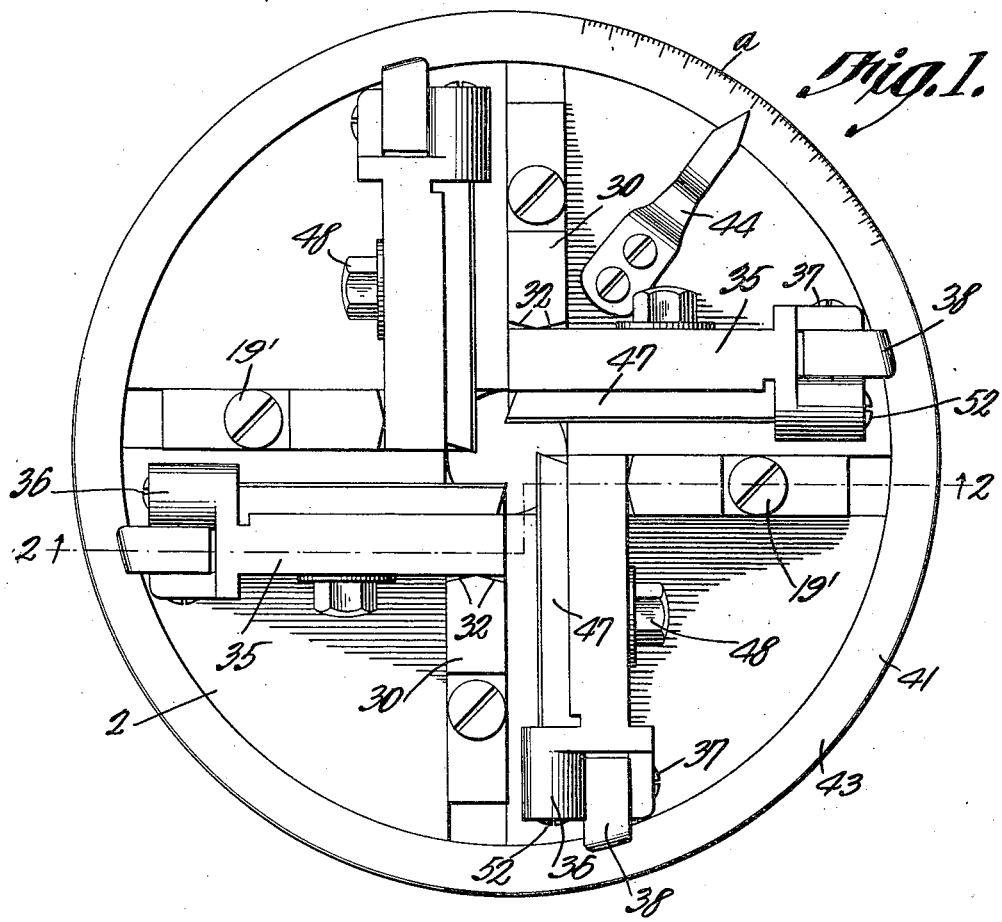
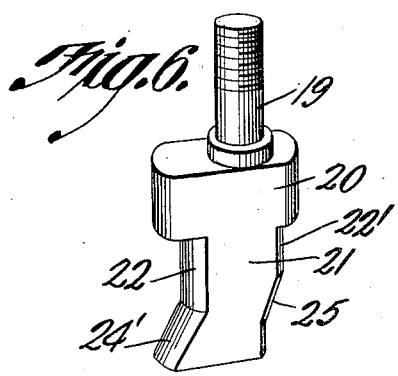
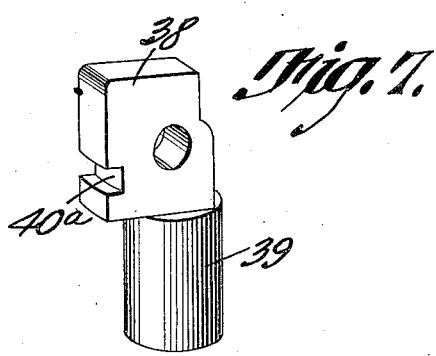
Witnesses
Victor R. Koontz, Inventor
by C. A. Snow & Co.
Attorneys

V. R. KOONTZ.
CUTTER HEAD.
APPLICATION FILED JUNE 23, 1913.

1,098,268.

Patented May 26, 1914.

Witnesses

Victor R. Koontz, Inventor
by C. A. Snow & Co.
Attorneys

V. R. KOONTZ.
CUTTER HEAD.
APPLICATION FILED JUNE 23, 1913.
1,098,268.
Patented May 26, 1914.
3 SHEETS—SHEET 3.
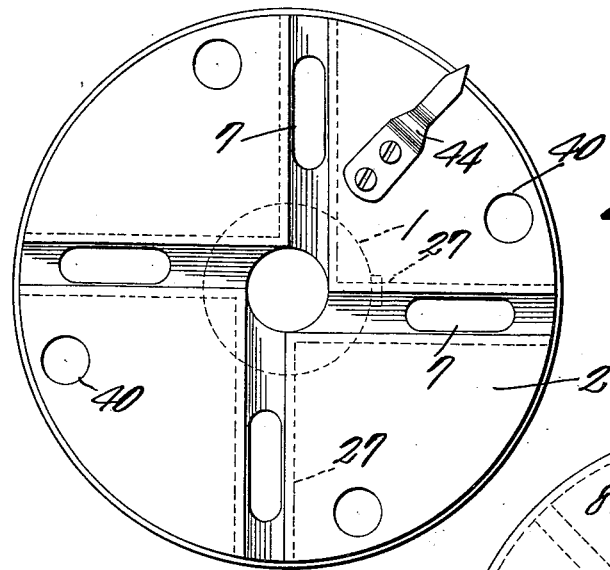
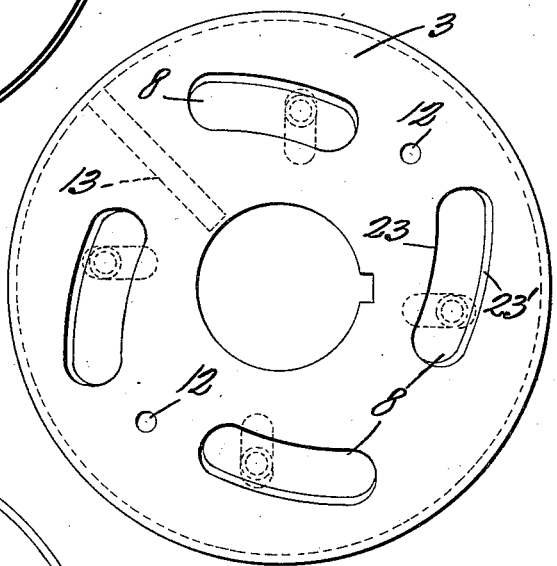
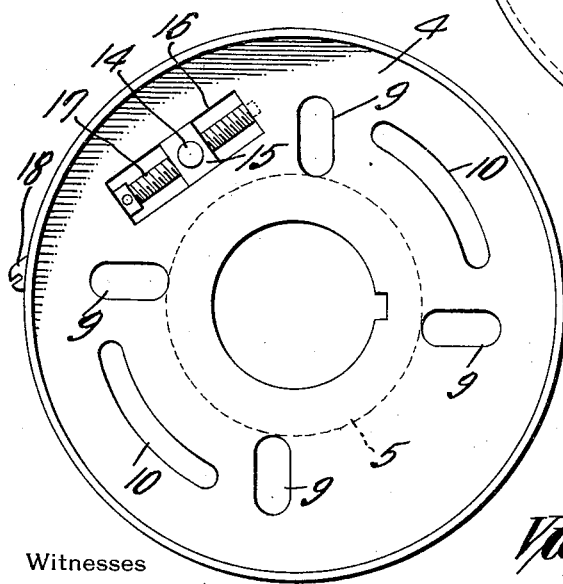
Witnesses
Victor R. Koontz, Inventor
by C. A. Snow & Co., Attorneys

UNITED STATES PATENT OFFICE.

VICTOR R. KOONTZ, OF WAYNESBORO, PENNSYLVANIA.

CUTTER-HEAD.

1,098,268.  Specification of Letters Patent.  Patented May 26, 1914.

Application filed June 23, 1913. Serial No. 775,385.

*To all whom it may concern:*

Be it known that I, VICTOR R. KOONTZ, a citizen of the United States, residing at Waynesboro, in the county of Franklin and State of Pennsylvania, have invented a new and useful Cutter-Head, (Case A,) of which the following is a specification.

The present invention relates to improvements in cutter heads, and more especially to that type of cutter head, in which the cutter or die holders, are so mounted as to be moved into and out of work engaging position, and to be so adjusted, that such movement is limited, one object of the present invention, being the provision of novel means, whereby the movement into and out of work engaging position is accomplished in a positive manner.

A further object of the present invention is the provision of a structure of this character, which provides for all of the necessary adjustments, whereby the cutting ends of the cutters or dies are positioned for cutting threads upon machine screws or bolts or lag screws.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 2:
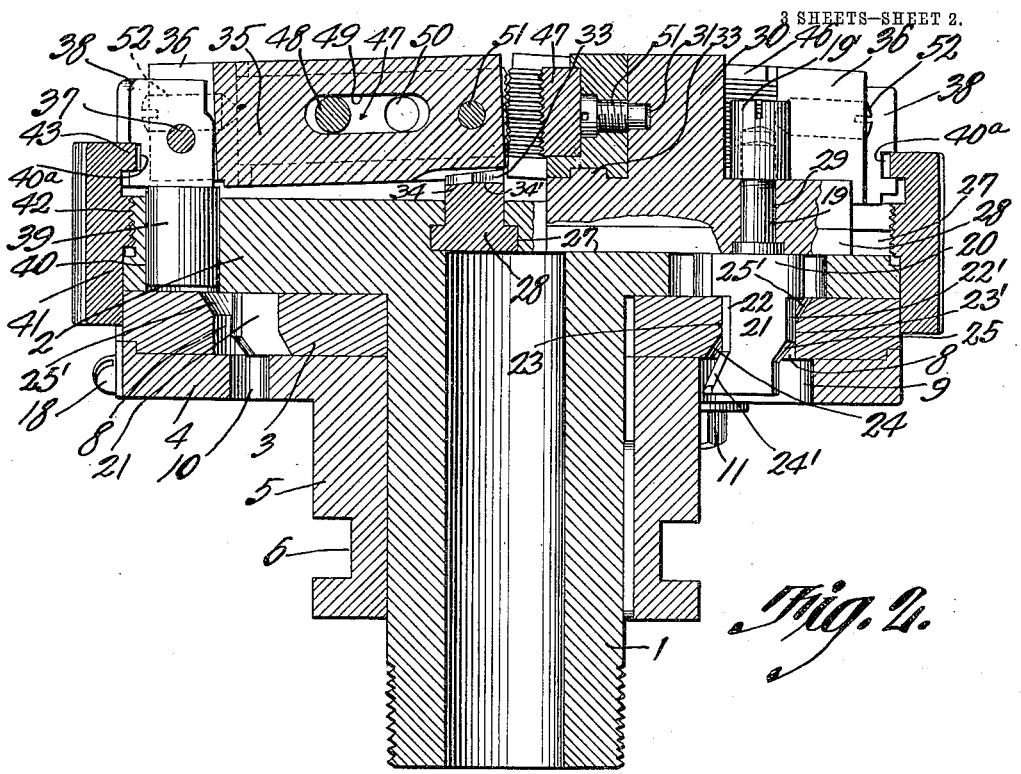
Figure 8:
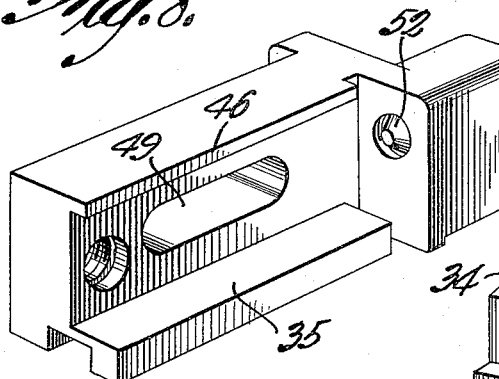
Figure 9:
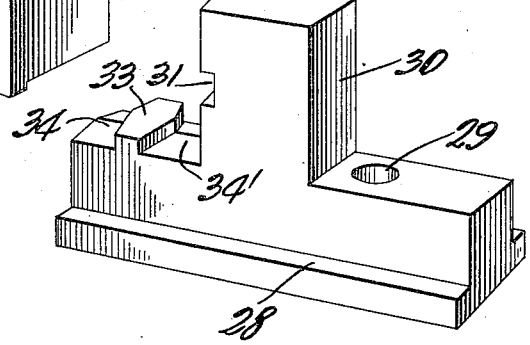

In the drawings—Figure 1 is a plan view of the base of the cutter head. Fig. 2 is a section taken on line 2—2 of Fig. 1. Fig. 3 is a plan view of the tool or cutter holder carrying member with the holders removed. Fig. 4 is a plan view of the plate for limiting the movement of the tool or cutter holder. Fig. 5 is a plan view of the main actuating member of the cutter head. Fig. 6 is a perspective view of the connection between the tool holder and operating mechanism for moving the tool holders into and out of work engaging position and for adjusting the same to limit such movement. Fig. 7 is a perspective view of the support for one member of the tool or cutter holder. Fig. 8 is a detail perspective view of the tool or cutter holder. Fig. 9 is a similar view of the operating member for swinging the cutter holder upon its pivot.

Referring to the drawings, the numeral 1 designates the main sleeve or tubular member of the cutter head, which has formed integral therewith, the disk or plate 2, there being disposed for limited oscillatory movement about the sleeve 1, a disk 3, which has also abutting it, the main controlling disk 4, whose sleeve 5 surrounds the sleeve 1 and is splined or keyed thereto for sliding movement. A circumferential groove 6 is formed in the sleeve 5, whereby means for imparting sliding movement to the sleeve 5 and disk 4 may be properly attached thereto. By means of the diametrically disposed arcuate slots 10 in the member 4, and the screw threaded apertures 12 of the member 3, bolts 11 provide a means to secure the disks 3 and 4 together for consonant action.

The tool holder carrying member or disk 2 is provided with slots 7 which are disposed tangentially to the center opening of the disk 2, as clearly illustrated in Fig. 3, while formed in the disk 3 are the arcuate slots 8, which are disposed at different tangents to the slots 7, the disk 4 being provided with the slots 9, which are disposed to aline with the slots 7 of the disk 2 while the slots 8 are interposed between the respective alined slots 7 and 9.

The face of the disk 3 adjacent to the disk 4 is provided with the radial groove or slot 13, which is disposed to receive the pin 14 of the block 15, said block 15 being disposed for sliding movement in the rectangular slot 16 of the disk 4 and being threaded upon the operating screw 17, whose operating end 18 is disposed exteriorly of the disk 4 in ready access to the operator. By this means, the block 15 is moved at any desired position within the slot 16 and thus oscillates the disk 3 to adjust the same so that the respective slots 8 are moved relatively to the alined slots 7 and 9 of the disks 2 and 4 and thus regulate, as will presently appear, the movement of the tool or cutter holders 35, to be described in detail later on.

Each cutter holder operating member 28, is provided with an operating pin or stud 19, whose elongated portion 20 is disposed for sliding movement in its respective slot 7 of the disk 2, while its reduced portion 21 is disposed within its respective slot 8 of the disk 3, with its curved faces 22—22' disposed for contact with the parallel faces 23—23' of the slot 8. When the parts are in the position, as shown in Fig. 2, the pin or stud 19 being positioned to place the tools or cutters in work engaging position, the movement of the sleeve 5, and consequently the disks 3 and 4, so that the disks 3 and 4 are separated from the disk 2, causes the inclined faces 24 and 25', to engage the inclined portions 24' and 25 of the pin or stud 19, and thus move the studs outwardly so as to place the tools or cutters out of work engaging position.

The outer face of the disk 2 is provided with a plurality of dove-tailed grooves 27, for the sliding reception of the base of the tool or cutter holder actuating member 28. This member, as clearly shown in Fig. 9, is provided with a bore 29 for the reception of the cylindrical portion of the stud or pin 19, the upper end of which is threaded for the reception of the locking cap 19', as clearly illustrated in Fig. 2. By this means it will be seen that when the pin 19 is actuated, due to the sliding movement of the disks 3 and 4, the member 28 will be moved inwardly or outwardly and thus as will presently appear, swing the tool holder so that its tool will move into and out of work engaging position. The member 28 is provided with the upstanding projection 30, whose outer face intermediate of the ends, is provided with a socket 31 and with the peculiar double beveled face 32, the purpose of which will presently appear. The upper face of the member 28 beyond the projection 30 is provided with the projection 33 having its opposite long sides beveled. The upper face at 34—34' is double beveled, as clearly illustrated in Fig. 9. The tool holder 35 is provided with the rear end 36, which by means of the pin 37 is pivoted to the flattened head 38 of the oscillating and vertically slidable pin 39. This pin 39, as clearly illustrated in Fig. 2, is disposed to fit within the cylindrical aperture 40 of the disk 2 and thus form a pivotal means or support for the tool holder 35 so that when the operating member 28 thereof is moved, the recess 45 of the tool holder 35 being fitted upon the double bevel projection 33 and across the double beveled portions 34—34' of the operating member 28, so as to have a slight swinging movement, the end adjacent the work is moved into and out of work engaging position. The head 38 of the pin 39 upon the outer edge is provided with the recess 40ª, while an adjusting ring 41 for the pin 38 is connected by the screw threads 42 to the disk 2 so that a slight movement of the ring 41 due to the engagement of the inwardly projecting rim 43 in the recesses 40ª of the pins 39, will cause the movement of the head 38 to and from the face of the disk 2. By this means, the pivotal point 37 of the tool holder 35 is raised or lowered relatively to the outer face of the disk 2, so that the inner end or the end adjacent the work, is presented at any desired angle. In order to indicate the relative adjustment of the ring 41, so that the pins 39 may be adjusted to an exactness, an indicator 44 is carried by the disk 2 and is disposed to correlate with the graduations $a$ upon the outer face of the ring 41, as clearly illustrated in Fig. 1.

The tool holder 35, as clearly illustrated in Fig. 8, is provided with the projecting rib 46, which coacts with the base of the holder to form a longitudinal receptacle for the tool 47, a bolt 48 being disposed to project through the elongated slot 49 of the tool holder 35 and engage one of the threaded apertures or sockets 50 of the tool to lock the tool relatively to the holder. In order that the tool holder 35 may be held with its inner end properly positioned relatively to the operating member 28, a pin 51 is positioned in the outer end thereof and has its reduced end projected within the recess 31 of the projection 30 of the member 28 while the face of the tool holder 35 adjacent the double beveled portion 32 is disposed to have the necessary rocking movement due to the change of angularity between the member 28 and the tool holder 35 caused by the actuation of the members 28 when the same are moved to place the tool into and out of work engaging position, such action being due to the fixed position of the pins 39 relatively to the disk 2. In order to hold the tool 47 against longitudinal movement, the screw 52 is carried by the end 36 of the tool holder 35.

From the foregoing description, it is evident that with a cutter head constructed according to and embodying the present invention, that the tools 47 may be adjusted after once positioned in their respective holders 35 so that the inner cutting ends are disposed for cutting threads upon machine screws or bolts, or upon wood screws, as for instance lag screws, where the points are slightly tapered. This adjustment is accomplished entirely through the ring 41 which may or may not be provided with means for locking the same in its desired adjusted position relatively to the disk 2 which is the main carrying member of the present cutter head.

In using the present cutter head, and assuming that the tools or cutters 41 are positioned in the respective holders 35, the bolts 11 are released, so that the disk 3 may be moved independently of the disk 4. The screw 17 is then actuated so as to move the block 15, and through the pin 14 oscillate the disk 3 to the desired position, at which time the bolts 11 are tightened, and thus the disk 3 is secured fixedly to the disk 4 so as to be moved therewith. As the disk 4 is only permitted a longitudinal movement upon the sleeve 1, it is therefore evident that the disks 3 and 4 will rotate with the disk 2 and in order to operate the respective tool holder actuating members 28, it is simply necessary to impart a longitudinal movement to the sleeve 5 and consequently the disks 4 and 3, and not the usual oscillatory movement as is the present practice. This movement, due to the peculiar construction of the slots 8 of the member 3 and the staggered ends of the pins or studs 19, impart the necessary sliding movement to the elongated head 20 of the pins or studs 19, and consequently slide the tool holder actuating members 28 in the recesses or grooves 27 of the disk 2. By this means, the projection 33 of the member 28 through the recess 45 of the tool or tool or cutter carrier 35 moves the inner end of the cutter holder 35 so that the cutting end of the tool 47 is moved to and from work engaging position, the holder 35 due to the pivoting of the same by means of the pin 39 being slightly flexed with the connections at 33 and 45 the pivoting point. The peculiar beveling of the member 30 and the projecting end of the member 28 and the peculiar shape of the shoulder 33 permits of the necessary flexing movement between the member 28 and the tool holder 35, while the beveled portions 34 and 34' permit of the necessary rocking movement due to the elevated or lowered position of the outer end of the tool holder 35 due to the adjusting ring 41, which is moved so as to present the rim 43 in different positions relatively to the outer face of the disk 2.

What is claimed is:

1. A cutter head, including a main carrying member, a cutter holder actuating member slidably mounted in the member, a cutter holder connected to the inner end thereof for movement into and out of work engaging position, an operating pin carried by the actuating member and mounted in the main carrying member, one end of said pin being projected beyond the opposite side of the main carrying member, two coöperating and adjusting actuating member operating members adjustably connected together for sliding movement to and from the main carrying member, coöperating means carried by one of the latter members and the projecting end of the pin whereby a sliding movement is imparted to the cutter holder actuating member when the two members are moved to and from the main carrying member, and means carried by one of the two members for controlling the distance of movement of the pin.

2. A cutter head, including a tubular support, a main carrying disk disposed at one end thereof, a cutter holder, an actuator for the holder slidably mounted in the outer face of said disk, an operating pin carried by the actuator and slidably mounted in the disk, said pin being held against oscillation by the disk and having a portion thereof projected in an opposite direction from the actuator, two disks mounted upon the tubular member and adjacent the face of the main disk, means for adjusting the two disks relatively to each other, said disks being disposed for sliding movement upon the tubular member and disposed to rotate therewith, and coöperative means carried by both of the sliding disks and the projecting portion of the pin for imparting sliding movement to the pin and cutter holder actuator consonantly with the sliding movement of the two disks.

3. A cutter head, including a tubular support, a main carrying disk disposed at one end thereof, a cutter holder, an actuator for the holder slidably mounted in the outer face of said disk, an operating pin carried by the actuator and slidably mounted in the disk, said pin being held against oscillation by the disk and having a portion thereof projected in an opposite direction from the actuator, two disks mounted upon the tubular member and adjacent the face of the main disk, means for adjusting the two disks relatively to each other, said disks being disposed for sliding movement upon the tubular member and disposed to rotate therewith, and coöperative means carried by both of the sliding disks and the projecting portion of the pin for imparting sliding movement to the pin and cutter holder actuator consonantly with the sliding movement of the two disks, one of said latter two disks being provided with means for limiting the inward movement of the actuator and for adjusting the cutter holder for action upon various sized work.

4. A cutter head, including a tubular support, a main carrying disk disposed at one end thereof, a cutter holder, an actuator for the holder slidably mounted in the outer face of said disk, an operating pin carried by the actuator and slidably mounted in the disk, said pin being held against oscillation by the disk and having a portion thereof projected in an opposite direction from the actuator, two disks mounted upon the tubular member and adjacent the face of the main disk, means for adjusting the two disks relatively to each other, said disks being disposed for sliding movement upon the tubular member and disposed to rotate therewith, and coöperative means carried by both of the sliding disks and the projecting portion of the pin for imparting sliding movement to the pin and cutter holder actuator consonantly with the sliding movement of the two disks, said pin being provided with a double cammed end, while one of the two disks is provided with a tangential groove through the face thereof having oppositely disposed cam shaped edges for coaction with the double cammed ends of the pin, whereby the sliding movement imparted to the two disks imparts sliding movement to the pin and cutter holder actuator.

In testimony that I claim the foregoing as my own, I have hereto affixed my signature in the presence of two witnesses.

VICTOR R. KOONTZ.

Witnesses:
JOSEPHINE ROLLMAN,
WATSON R. DONSON.

Copies of this patent may be obtained for five cents each, by addressing the "Commissioner of Patents, Washington, D. C."